J. GAGE.
SAFETY LOCK FOR MOTOR CARS.
APPLICATION FILED JUNE 1, 1920.
1,371,886. Patented Mar. 15, 1921.
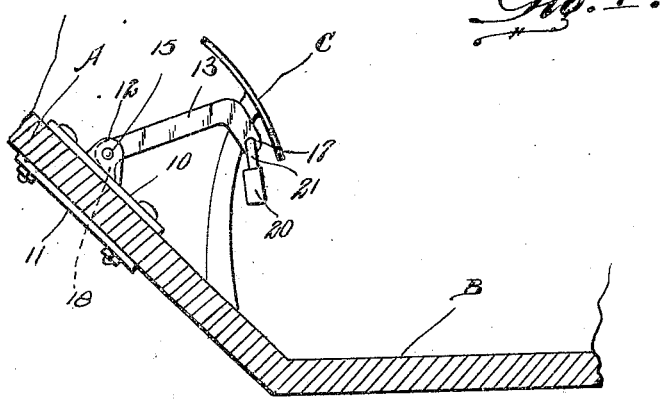
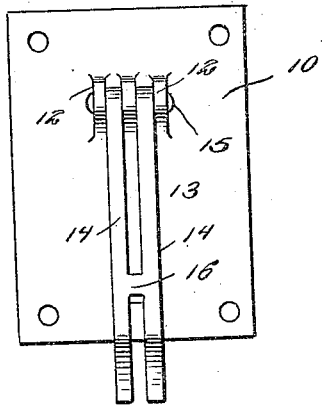
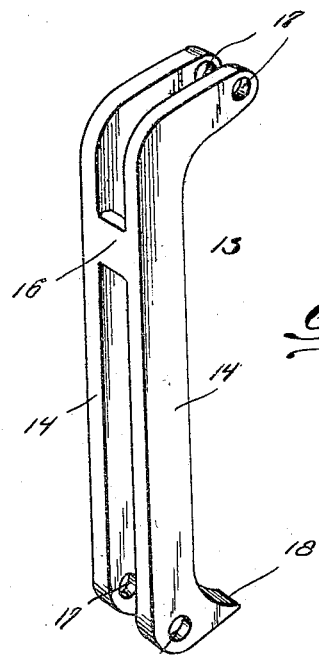
John Gage.
INVENTOR
BY Victor J. Evans.
ATTORNEY
WITNESSES:

UNITED STATES PATENT OFFICE.

JOHN GAGE, OF NORTH LITTLE ROCK, ARKANSAS.

SAFETY-LOCK FOR MOTOR-CARS.

1,371,886.

Specification of Letters Patent. Patented Mar. 15, 1921.

Application filed June 1, 1920. Serial No. 385,810.

*To all whom it may concern:*

Be it known that I, JOHN GAGE, a citizen of the United States, residing at North Little Rock, in the county of Pulaski and State of Arkansas, have invented new and useful Improvements in Safety-Locks for Motor-Cars, of which the following is a specification.

This invention relates to locking devices, particularly to locks for preventing the theft of automobiles, and has for its object the provision of a device adapted to be mounted upon the dash of an automobile and adapted for engagement with the clutch pedal and to have a padlock associated therewith, the purpose being to prevent movement of the clutch pedal from its neutral position.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a sectional view through the dash and floor boards of an automobile, showing my locking device in position and engaged with the clutch pedal, Fig. 2 is a plan view, and Fig. 3 is a perspective view of a locking member detached.

Referring more particularly to the drawings, the letter A designates the dash of an automobile, B designates the floor boards, and C designates the clutch pedal.

In carrying out my invention I provide a pair of rectangular plates 10 and 11 formed of metal which are bolted onto opposite sides of the dash, the plate 10 being toward the driver. Formed upon the plate 10 is a plurality of ears 12 with which is associated a wall member 13 which is formed as a pair of bars 14 spaced apart and disposed between the successive ears 12 and pivoted by a suitable pin or bolt 15. Toward their outer ends the bars 14 are connected by a transverse web 16. These bars 14 are L-shaped and have their extremities formed with holes 17. At their pivoted ends the bars 14 constituting the locking member are formed with shoulders 18 engageable with the plate 10 for limiting downward swinging movement of the bars.

Under ordinary conditions, that is when use of the device is not desired, the locking member 13 is swung upwardly into engagement with the dash and may be held in such position by means of any suitable catch 19. When it is desired to lock the automobile the locking member 13 is swung downwardly whereupon it will assume the inclined position shown in Fig. 1. The clutch pedal C is moved forwardly into its neutral position, in the case of a Ford automobile or into its out position in the case of an automobile having sliding gear transmission. In any event the pedal 16 is swung forwardly to be disposed between the angular free ends of the bars 14, after which a suitable padlock 20 has its shackle 21 passed through the holes 17. It will be observed that movement of the pedal will thereupon be prevented so that it will be impossible to throw the transmission into gear in either direction, regardless of to what type of automobile my device is applied.

From the foregoing description and a study of the drawings it will be apparent that I have thus provided a simply constructed and easily applied locking device which will be very efficient and which will entail but slight expense in its manufacture and installation.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A device of the character described comprising a metal plate secured upon the dash or foot board of an automobile, a plurality of ears formed on said plate, a vertically swingable locking member associated with said ears and formed as a pair of spaced bars and pivotally connected between said ears, said bars being connected adjacent their free ends by an integral transverse web, said bars being L-shaped and having their angular portions adapted for disposition in straddling relation to the clutch pedal of an automobile, the extremities of the bars being formed with holes for the reception of a padlock shackle, and shoulders formed on said bars at their pivoted ends and engageable with the plate for limiting downward swinging movement of the bars.

In testimony whereof I affix my signature.

JOHN GAGE.